United States Patent [19]
Yamada et al.

[11] Patent Number: 5,236,730
[45] Date of Patent: Aug. 17, 1993

[54] CANDY AND PRODUCING METHOD THEREOF

[75] Inventors: Takao Yamada; Yoshio Iijima, both of Tokyo, Japan

[73] Assignee: Sakuma Seika Kabushiki Kaisha, Tokyo, Japan

[21] Appl. No.: 759,303

[22] Filed: Sep. 13, 1991

[30] Foreign Application Priority Data

Jun. 18, 1991 [JP] Japan .................. 3-242914

[51] Int. Cl.$^5$ .............................................. A23G 3/00
[52] U.S. Cl. ...................................... 426/571; 426/572; 426/660; 426/573
[58] Field of Search ............... 426/572, 660, 573, 103, 426/454

[56] References Cited

U.S. PATENT DOCUMENTS

| | | | |
|---|---|---|---|
| 4,117,176 | 9/1978 | Taylor | 426/660 |
| 4,307,126 | 12/1981 | Sano et al. | 426/660 |
| 4,323,588 | 4/1982 | Vink et al. | 426/660 |
| 4,605,561 | 8/1986 | Lang | 426/572 |
| 4,714,620 | 12/1987 | Bunick | 426/572 |
| 4,888,187 | 12/1989 | Given, Jr. et al. | 426/660 |
| 4,911,937 | 3/1990 | Crosello et al. | 426/660 |

FOREIGN PATENT DOCUMENTS

| | | | |
|---|---|---|---|
| 0068256 | 5/1980 | Japan | 426/660 |
| 0105614 | 8/1980 | Japan | 426/660 |
| 8303524 | 10/1983 | World Int. Prop. O. | 426/660 |

*Primary Examiner*—Jeanette Hunter
*Attorney, Agent, or Firm*—Lowe, Price, Le Blanc & Becker

[57] ABSTRACT

A candy is formed from a setting material which includes a boiled down, cooled and solidified jelly syrup, mixed and scattered as small pieces in a soft bulk material containing fats and oils which are separately boiled down and cooled. The quality can be prevented from deteriorating by saccharification by use of the jelly, and softness and smoothness of the candy to the tongue can be preserved for a long time. A relatively large amount of jelly can be mixed into the bulk material without damaging the appearance of the candy.

17 Claims, 6 Drawing Sheets

FIG. 7

|  | feel when starting chewing (in winter) | smoothness | fresh feeling |
|---|---|---|---|
| conventional candy containing fondant cream | hard | rough | absent |
| single layer soft candy according to the invention | soft | smooth | present |
| soft candy having a center according to the invention | soft | smooth | present |

CANDY AND PRODUCING METHOD THEREOF

FIELD OF THE INVENTION

This invention generally relates to a soft candy, such as a caramel, nougat, marshmallow, or tablet type candy, in which finely divided gelatin jelly, starch jelly, pectin jelly, etc. (hereinafter termed "jelly", but sometimes known in the art as "gel"), is mixed, and more particularly to a candy which prevents sticking to the teeth and maintains for a long time both its quality and its original softness.

BACKGROUND OF THE INVENTION

In conventional soft candy, a fondant cream is mixed in with the soft (generally chewable) bulk material of which the candy is made to prevent stickiness to the teeth. Minute sugar crystals of the fondant cream are scattered in the bulk material of the soft candy. Irregular sugar in the candy is thereby crystallized (saccharified), and accordingly stickiness to the teeth is prevented.

However, such soft candy mixed with fondant cream will readily absorb moisture when preserved for a long time, and may become hard, e.g., in the cold of winter. The reason is that the irregular sugar in the bulk material of the soft candy is crystallized by sugar crystals in the fondant cream as time passes, and the amount of sugar crystals in the candy increases. An equilibrium humidity is then easily increased and, in the low humidity of winter, moisture from the surface of the soft candy evaporates and the amount of crystals in the sugar in the candy increases.

In a conventional method of producing jelly (as here identified), it is typical that after sugar and starch syrup are boiled down, materials such as gelatin, arabic gum, starch, pectin, agar, carrageenan, and a certain amount of fruit juice are added.

It is difficult to produce a soft candy by providing a large amount of jelly syrup in the center of a quantity of the soft bulk material. In a conventional method, jelly syrup of only about 10% of the weight can be so included, but the jelly syrup easily leaks from the center of the candy material. Accordingly, the quality of appearance of the soft candy is easily damaged and the candy will tend to stick to its wrapper.

SUMMARY OF THE INVENTION

Accordingly, it is an object according to a preferred embodiment of the invention to provide a soft candy, e.g., a nougat or marshmallow type candy which prevents stickiness to the teeth without the use of a fondant cream, which is soft and pleasant on the tongue, is not damaged in appearance by mixture therewith of a large amount of jelly, is easily removed from a wrapper, and is not easily saccharified even when preserved for a long time.

To attain the above and other objects, according to the invention, a setting material which comprises a boiled down, cooled and solidified jelly syrup which includes one or more kinds of gelatin, starch, arabic gum, pectin, agar, and carrageenan, with saccharides such as sugar, fruit sugar, grape sugar, etc. (hereinafter termed "sugar"), starch syrup and arabic gum well mixed together.

According to the invention, the fondant cream is not used at all to prevent stickiness to the teeth, and the jelly which is used is actually set. Accordingly, quality can be prevented from deteriorating by saccharification, and the candy can be prevented from becoming hard even in winter by absorption of moisture in a manner otherwise inherent to jelly. The candy is soft and smooth to the tongue and can be preserved for a long time. A large amount of jelly can be mixed into the bulk material forming the candy, without damaging the appearance of the candy. Fats and oils can be mixed in with the soft center material, and the candy is accordingly easy to remove from both a mold and a wrapping paper.

Other related objects and features of this invention will become understood from the following description with reference to the accompanying drawings.

BRIEF DESCRIPTION OF THE DRAWINGS

The invention will be described in more detail in conjunction with the drawing, wherein;

FIG. 7 shows a result of a panel test of the soft candy according to this invention.

DESCRIPTION OF THE PREFERRED EMBODIMENTS

Figure 1:
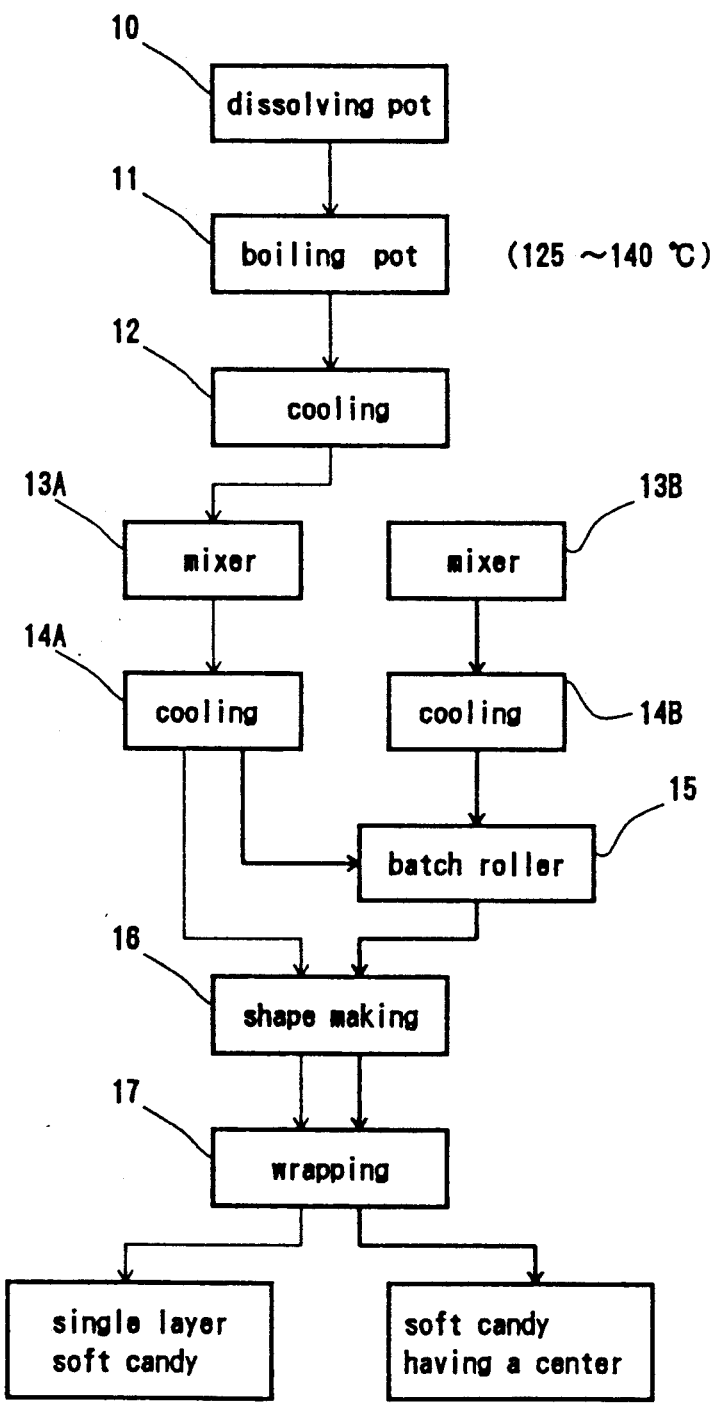
FIG. 1 is a flow chart illustrating a process for production of a soft candy.

In a soft candy such as a caramel, according to this invention, a setting material is used which comprises a jelly syrup heated at a temperature of 100°-120° C., which then cools and solidifies for about one night and is then mixed and scattered into a soft bulk material containing fats and oils in an amount of 5-20% of the weight of the material which is boiled down and cooled naturally or forcibly to 60°-70° C. This mixture can become a center material, i.e., it can be covered with a hard candy shell or a soft candy cover made of sugar and starch syrup. The setting material also can be mixed into a soft candy bulk material.

In a nougat type candy according to the invention, a soft material containing fats and oils is boiled down, and is added slowly and mixed in with a foaming agent and water which are whipped, and thereafter a setting material comprising a boiled down, cooled and solidified jelly syrup is mixed and scattered therein. Nuts, fruit juice, milk products, or an acidifier also can be added.

In a marshmallow type candy according to the invention, sugar and starch syrup are boiled down, are added slowly and mixed in with gelatin and water and whipped. A setting material, which comprises a boiled down, cooled and solidified jelly syrup, and a selected flavor are mixed and scattered therein. Nuts, fruit juice, or acidifier can be added.

In a tablet type candy according to the invention, sugar, grape sugar, starch, pectin, gelling agent, and a taste enhancer (e.g., milk products or powered fruit juice) are mixed with a setting material which comprises a boiled down, cooled and solidified jelly syrup.

An important aspect of the invention is that the jelly syrup is set. If the jelly syrup is mixed in with the soft bulk material without the described setting, the jelly and the soft bulk material are mixed and the soft candy is easily stuck to the teeth. On the other hand, if the jelly which is set is mixed in the soft bulk material, and small pieces of jelly are properly scattered in the soft tough, the resulting soft candy is smooth and pleasant to the tongue and is not easily stuck to the teeth.

A certain proportion of sugar, starch syrup, and water is warmed and dissolved at a certain temperature and the mixture is boiled down at a certain temperature to produce the jelly syrup. When the temperature of the jelly syrup falls below 100° C., certain proportions of gelatin and water are added therein and dissolved. The jelly syrup is then set by being left alone at ambient temperature for a certain number of hours. Milk products, fruit juice, or an acidifier such as citric acid, malic acid, fumaric acid, etc., can be added therein. Thus, a jelly syrup (which comprises one or more mixed and dissolved sugar, starch syrup, sorbitol, erythritol, reducing malt starch syrup, etc.) having a constituent serving as a gelling agent, e.g., gelatin jelly, pectin jelly, starch jelly, etc., is boiled down to a certain temperature (corresponding to 75-85% saccharinity). When its temperature falls below 100° C., it is mixed in one kind or more than two kinds of gelling agent, gelatin, starch, pectin, arabic gum, carrageenan, agar, etc. which is swelled by water and dissolved. It is then cooled and set to be used as the setting material in the invention.

The jelly made and set as above containing about 20% moisture and the soft bulk material containing about 7-8% moisture together become soft candy containing about 6-17% moisture, which is soft to chew and has a small hygroscopicity.

In producing soft candy, the bulk material is made from sugar, starch syrup fats and oils, starch, an emulsifying agent, various kinds of syrup, gelatin, and one or more other gelling agents. In producing a soft milk candy of the caramel type, the bulk material is made from sugar, starch syrup, fats and oils, an emulsifying agent, a condensed milk (e.g., fresh cream, butter), yogurt, etc. In a chewing candy, gelatin, arabic gum, starch, gelling agent, etc., also can be used.

The fats and oils are mixed in the bulk material and accordingly the candy is easily removed from a wrapper. The invention is not limited to the above composition, but can be formed to various compositions in accordance with consumer's needs. Fondant cream can be added in the bulk material.

In this invention, the bulk material which covers the center material is made from more than one kind of saccharides and/or milk products, and more than one kind of whole or nonfat condensed milk, butter, fresh cream, cheese, milk, and animal or vegetable fats and oils, which are mixed together.

One or more kinds of sugar, starch syrup, sorbitol, erythritol, reducing malt starch syrup, etc., are used. Vegetable or animal fats and oils and emulsifying agent (condensed milk, butter, fresh cream, yogurt, concentrated fruit juice, or herbs) are mixed therein and are dissolved, boiled down to a certain temperature (125°-140° C.), and cooled. Fondant cream and a flavoring agent are mixed therein by a mixer, resulting in the soft candy bulk material according to the invention.

The hard candy bulk material to be used in the invention is made from sugar (saccharides) and starch syrup. Various conventional additives can be also used.

An example of producing a process for producing soft candy composed as above will now be described with reference to FIG. 1. Sugar, starch syrup, vegetable fats and oils, and an emulsifying agent (or milk product, yogurt, fruit juice, etc.) are dissolved in a dissolving pot 10, boiled down at a temperature of 125°-140° C. in a boiling pot 11, and then cooled (12).

Figure 2:
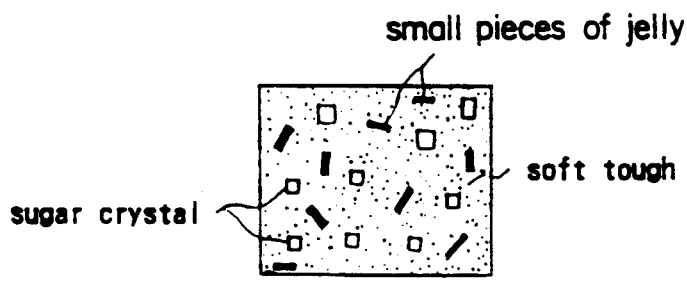
FIG. 2 shows a structure of a soft single layer candy.

To produce a single layer soft candy, as shown in FIG. 2, the soft cooled bulk material, a setting material, and a flavor (comprising a fondant cream, acidifier, fruit juice, and a milk product) are mixed and stirred in a mixer 13A, cooled (14A), formed into a desirable shape (16), and wrapper (17) by a conventional wrapping machine.

Figure 3:
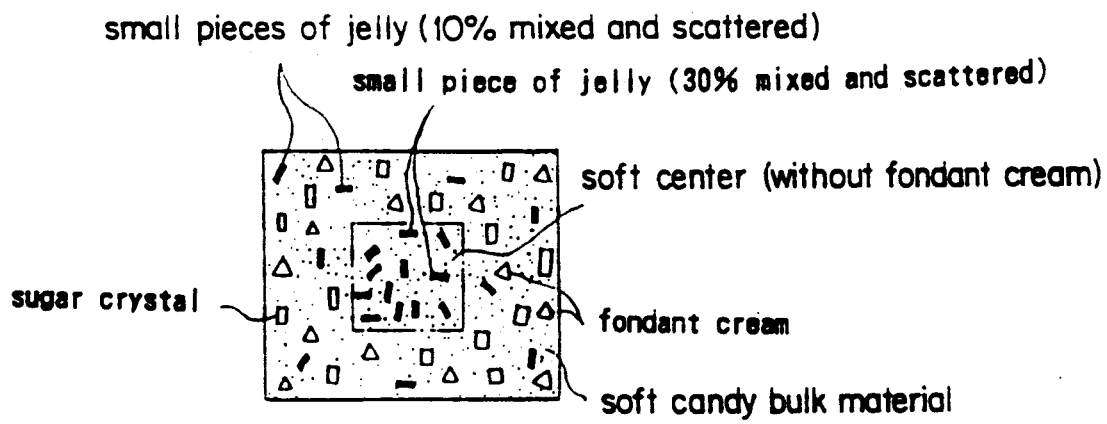
FIG. 3 shows a structure of a soft candy having a center.

To produce a soft candy having a center, as shown in FIG. 3, making the cooled material a center material (as shown in FIG. 1) the soft material cooled in step 12, the setting material, and a flavor (e.g., a fondant cream, acidifier, fruit juice, milk product) are mixed and stirred in the mixer 13A, and then cooled (14A). At the same time, the soft candy material is mixed and stirred in a mixer 13B, and is cooled (14B). They pass through a batch roller (e.g., a double mold machine) 15, are formed into a desirable shape (16), and then wrapper (17) by a conventional wrapping machine.

Figure 4:
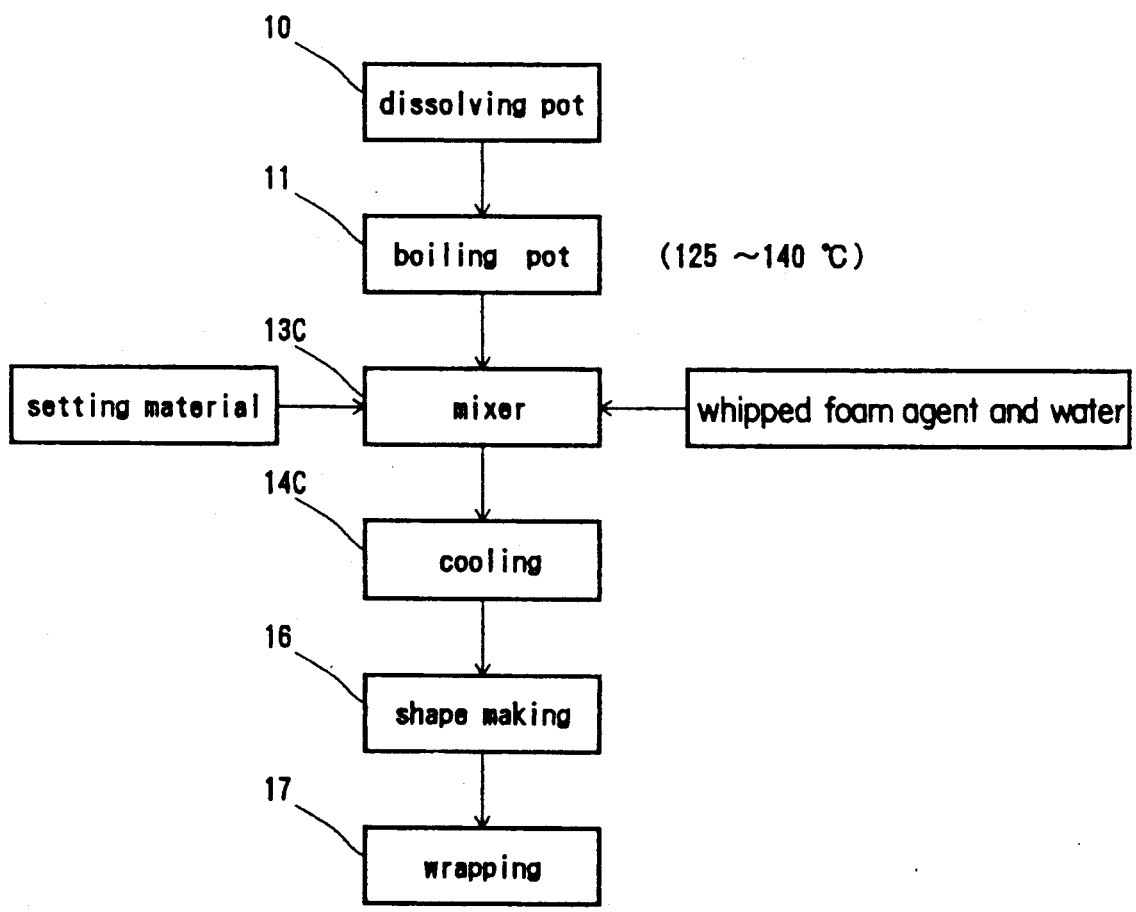
FIG. 4 is a flow chart showing a process for production of a nougat type candy.

To produce a nougat type andy, as shown in FIG. 4, sugar, starch syrup, vegetable fats and oils, and an emulsifying agent (or starch, gelatin, etc.) are dissolved in the dissolving pot 10, and boiled down at the temperature of 125°-140° C. in the boiling pot 11. The boiled material is added slowly and mixed in with a whipped mixture of foam agent and water in a mixer 13C. A setting material and flavor are added and mixed therein (e.g., nuts, fruit juice, or acidifier can be added). The mixed material is cooled (14C), formed into a desirable shape (16), and then wrapper (17) in a conventional wrapping machine.

Figure 5:
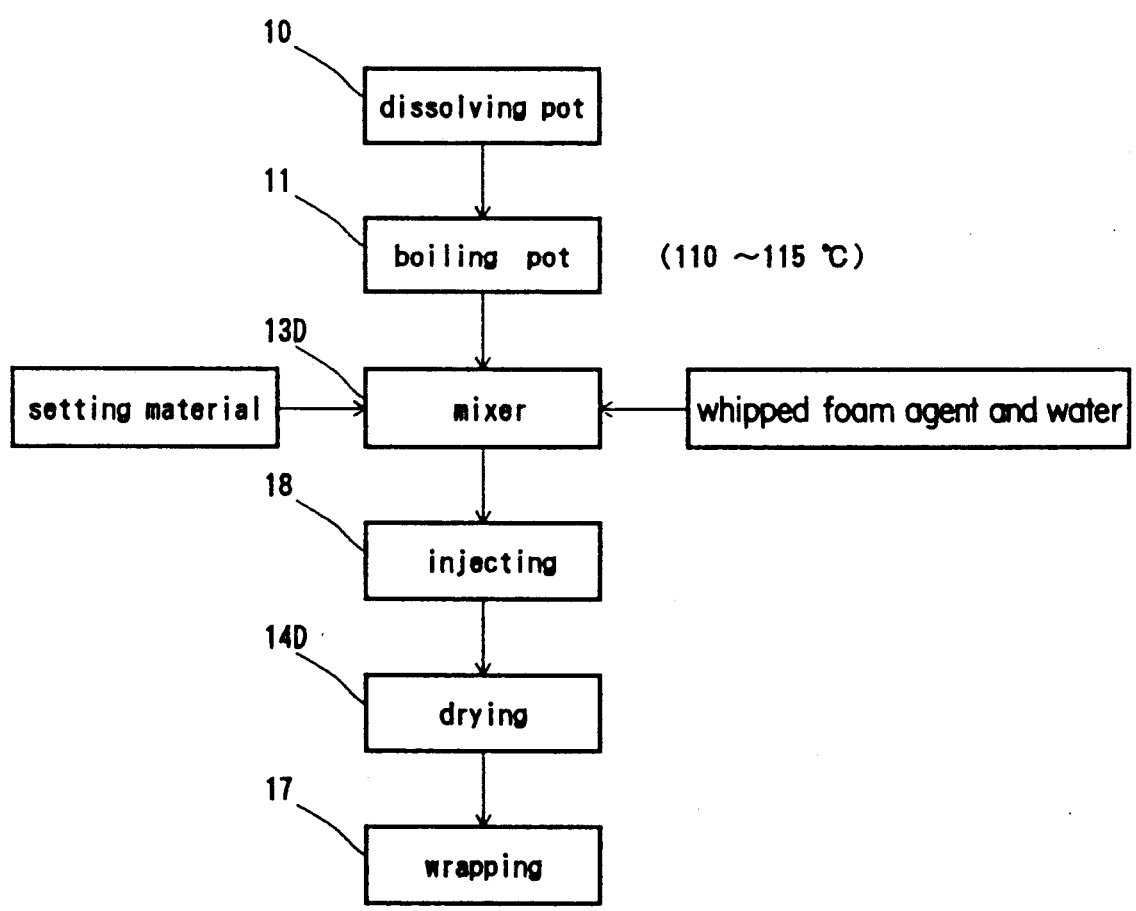
FIG. 5 is a flow chart showing process for production of a marshmallow type candy.

To produce a marshmallow type candy, as shown in FIG. 5, sugar and starch syrup are dissolved in the dissolving pot 10, and boiled down at a temperature of 112°-115° C. in the boiling pot 11. The boiled material is added slowly and mixed in with whipped gelatin and water in a mixer 13D. A setting material and flavor are added and mixed therein so that specific gravity becomes 0.5-0.6. (A milk product, nuts, fruit juice, or acidifier can be added). The mix is injected (18) into a starch mold, dried (14D), formed into a desirable shape (16), and then wrapper (17) in a conventional wrapping machine.

Figure 6:
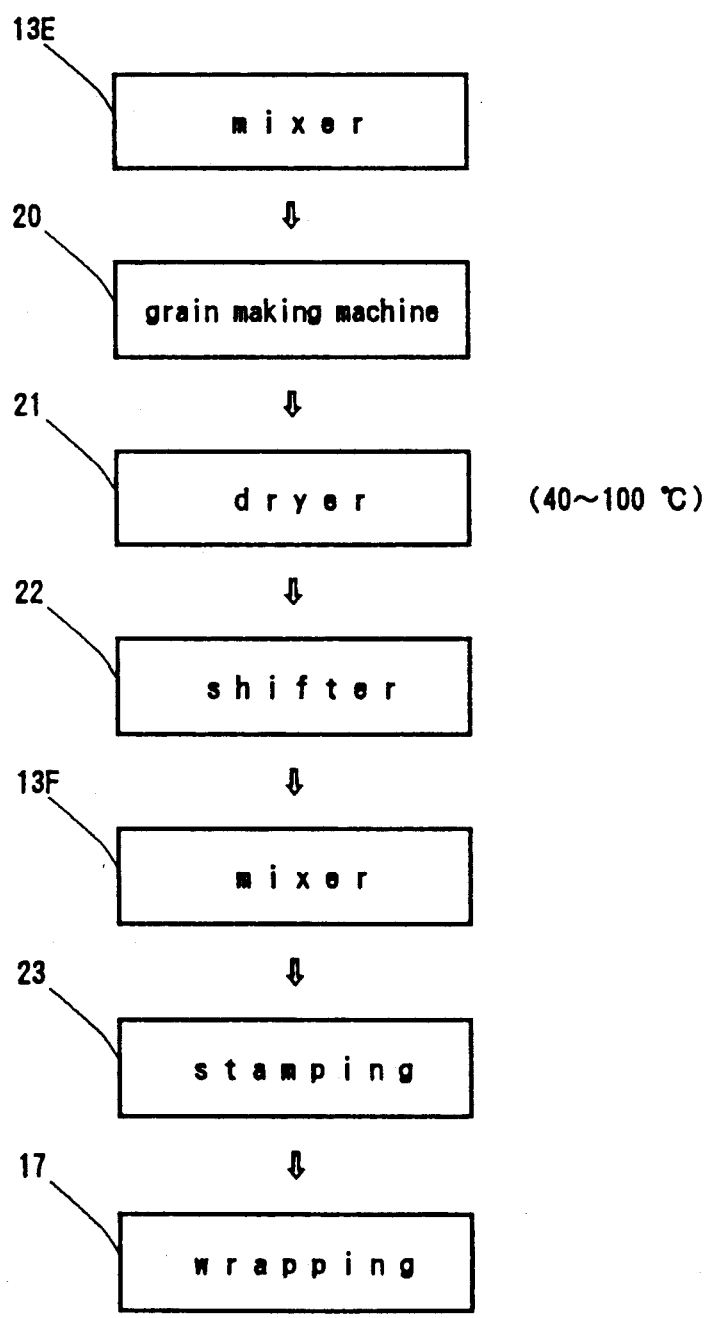
FIG. 6 is a flow chart showing a process for production of a hard tablet type candy.

To produce a hard table type candy, as shown in FIG. 6, the setting material, which comprises boiled down, cooled and solidified jelly syrup, and sugar, grape sugar, starch, pectin, gelling agent, and taste enhancer (e.g., milk product, powder fruit juice) are uniformly mixed in a mixer 13E. The material is formed into a desirable size in a grain-making machine 20, dried for a certain amount of time at a temperature of 40°-100° C. in a dryer 21, and shape adjusting thereof is then carried out in a shifter 22. An anti-adhesive agent and flavor are added therein, and uniformly mixed in a mixer 13F. Thereafter it is stamped in a stamping machine 23 to have a certain shape and wrapper (17) in a conventional wrapping machine.

To produce a soft tablet type candy, the setting material is used in a conventional fluid bed drying method.

In the invention, the soft material can be 50-98% of the weight, and the setting material can be 50-2% of the weight. When the setting material is less than 50% of the weight, the center material is properly soft and is easy to sue, and stickiness to the teeth can be prevented by including the setting material in a proportion of more than 2% of the weight. However, the invention is not limited to this quantity.

The preferred embodiment will be described more concretely as follows. 50 kg of sugar, 50 kg of starch syrup, and 17 kg of water are warmed and dissolved in a cooker to have 80-85% saccharinity, and the mix is then boiled down to produce the so-called jelly syrup. When the jelly syrup falls below 100° C., 5 kg of gelatin and 10 kg of water are added therein, and dissolved. The mix is set by being left for about 5-10 hours, e.g., overnight, at ambient temperature.

To produce the soft bulk material, 44 kg of sugar, 64 kg of starch syrup, 10 kg of vegetable fats and oils, 0.1 kg of emulsifying agent, and 13 kg of water are boiled down in a cooker at a temperature of 125°-140° C., and cooled. 10 kg of fondant cream is then mixed therein in a mixer.

The soft bulk material produced as above and the jelly set as above are mixed in a mixer. As a result, soft candy can be produced in which small pieces of jelly are properly scattered in the soft bulk material, as shown in FIG. 2.

The soft candy produced as above can become a soft single layer candy, as shown in FIG. 2. It can also become a center material 1, covered with the soft candy bulk material 2 to produce a soft candy having a center, as shown in FIG. 3.

Results of a panel test of the soft candy, produced as described above, is shown in FIG. 7. It is apparent from the test that the candy produced in the preferred embodiment of the invention is particularly different from a conventional candy using fondant cream in softness and smoothness. The andy also has a fresh feel to it.

Although the invention has been described with respect to a specific preferred embodiment for a complete and clear disclosure, the appended claims are not to be thus limited but are to be construed as embodying all modifications and alternative constructions that may occur to one skilled in the art and which fairly fall within the basic teaching therein set forth.

What is claimed is:

1. A soft candy, comprising:
   a setting material comprising a boiled down, cooled and solidified jelly syrup; and
   a soft bulk material containing fats and oils, which is boiled down and cooled and then mixed with said setting material and shaped to form individual candy pieces.

2. A soft candy, comprising:
   a setting material comprising a boiled down, cooled and solidified jelly syrup; and
   a soft bulk material containing fats and oils, which is separately boiled down and cooled,
   wherein the setting material is formed into small pieces mixed in with the soft bulk material to form a center portion that is then covered with the soft bulk material to form the finished candy.

3. A soft candy according to claim 2 wherein a predetermined amount of the setting material, in the form of small pieces, is mixed in with the soft bulk material covering the center portion.

4. A hard candy having a soft center, comprising:
   a setting material formed of a boiled down, cooled and solidified jelly syrup; and
   a soft bulk material containing fats and oils which, which is separately boiled down and cooled,
   wherein the setting material is formed as small pieces mixed with the soft bulk material to form a center portion which is then covered with a hard candy shell.

5. A nougat type candy, comprising:
   a soft bulk material containing fats and oils which are boiled down and cooled and then mixed with a whipped foam agent and water to form a mixture; and
   a setting material which includes a boiled down, cooled and solidified jelly syrup, mixed into said mixture.

6. A marshmallow type candy, comprising:
   a first material comprising a sugar and starch syrup which is boiled down and cooled and then mixed with whipped gelatin and water; and
   a setting material which comprises boiled down, cooled and solidified jelly syrup,
   said first material, said setting material and a selected flavor being mixed to form the marshmallow type candy.

7. A table type candy, comprising:
   a mixture of sugar, grape sugar, starch, pectin, gelling agent, and a taste enhancer; and
   a setting material comprising a boiled down, cooled and solidified jelly syrup,
   wherein said mixture and said setting material are mixed in predetermined proportions and formed into candy tablets.

8. A candy according to claim 1, wherein:
   the soft bulk material is 50-90% of a total weight, and the setting material is 50-10% of the total weight.

9. A candy according to claim 2, wherein:
   the soft bulk material is 50-90% of a total weight, and the setting material is 50-10% of the total weight.

10. A candy according to claim 4, wherein:
    the soft bulk material is 50-90% of a total weight, and the setting material is 50-10% of the total weight.

11. A method for manufacturing a soft candy, comprising the steps of:
    forming a jelly syrup by dissolving in a dissolving pot a mixture comprising 50 units of sugar, 50 units of starch syrup, and 17 units of water, to obtain for the dissolved mixture a saccharinity in the range 80-85%, to produce a jelly syrup; and
    boiling the jelly syrup at a temperature 100°-120° C.;
    cooling the jelly syrup overnight;
    forming a soft bulk material by dissolving 44 units of sugar, 64 units of starch syrup, 10 units of a selected vegetable fat, 0.1 unit of an emulsifying agent, boiling the mixture at a temperature of 125°-140° C., and cooling the same to form a soft bulk material; and
    mixing small pieces of the solidified jelly syrup into the soft bulk material and forming the same into candy pieces.

12. A method of producing a soft candy, comprising the steps of:
    forming a jelly syrup by dissolving in a dissolving pot a mixture comprising 50 units of sugar, 50 units of starch syrup, and 17 units of water, to obtain for the dissolved mixture a saccharinity in the range 80-85%, to produce a jelly syrup; and
    boiling the jelly syrup at a temperature 100°-120° C.;
    cooling the jelly syrup overnight;
    forming a soft bulk material by dissolving 44 units of sugar, 64 units of starch syrup, 10 parts of a selected vegetable fat, 0.1 unit of an emulsifying agent, boiling the mixture at a temperature of 125°-140° C., and cooling the same to form a soft bulk material;

mixing small pieces of the solidified jelly syrup with the soft bulk material and forming the same into candy centers; and covering said candy center with a hard candy material to form a soft-centered candy.

13. A method for producing a soft candy, comprising the steps of:

forming a jelly syrup by dissolving in a dissolving pot a mixture comprising 50 units of sugar, 50 units of starch syrup, and 17 units of water, to obtain for the dissolved mixture a saccharinity in the range 80–85%, to produce a jelly syrup; and boiling the jelly syrup at a temperature 100°-120° C.; cooling the jelly syrup overnight;

forming a soft bulk material by dissolving 44 units of sugar, 64 units of starch syrup, 10 units of a selected vegetable fat, 0.1 unit of an emulsifying agent, boiling the mixture at a temperature of 125°-140° C., and cooling the same to form a soft bulk material;

mixing small pieces of the solidified jelly syrup with the soft bulk material and forming the same into candy centers; and covering said candy center with a said soft bulk material to form a soft-centered candy.

14. The method according to claim 13, comprising the further step of:

mixing small pieces of said solidified jelly syrup into said soft bulk material covering said center.

15. A method of producing a nougat type candy, comprising the steps of:

forming a jelly syrup by dissolving in a dissolving pot a mixture comprising 50 units of sugar, 50 units of starch syrup, and 17 units of water, to obtain for the dissolved mixture a saccharinity in the range 80–85%, to produce a jelly syrup; and boiling the jelly syrup at a temperature 100°-120° C.; cooling the jelly syrup overnight;

forming a soft bulk material by dissolving 44 units of sugar, 64 units of starch syrup, 10 units of a selected vegetable fat, 0.1 unit of an emulsifying agent, boiling the mixture at a temperature of 125°-140° C., and cooling the same to form a soft bulk material;

mixing said soft bulk material is with a mixture of a foaming agent and water;

forming small pieces of the solidified jelly syrup; and mixing the small pieces with the mixture of soft bulk material and foam agent and water mixture, and forming therefrom pieces of nougat candy.

16. A method for producing a marshmallow type candy, comprising the steps of:

forming a jelly syrup by dissolving in a dissolving pot a mixture comprising 50 units of sugar, 50 units of starch syrup, and 17 units of water, to obtain for the dissolved mixture a saccharinity in the range 80–85%, to produce a jelly syrup; and boiling the jelly syrup at a temperature 100°-120° C.; cooling the jelly syrup overnight;

forming a soft bulk material by dissolving 44 units of sugar, 64 units of starch syrup, 10 units of a selected vegetable fat, 0.1 unit of an emulsifying agent, boiling the mixture at a temperature of 125°-140° C., and cooling the same to form a soft bulk material;

dissolving 5 parts of gelatin in 10 parts of water and whipping the same;

mixing the jelly syrup at a temperature of 112°-115° C. with the whipped mixture of gelatin and water, in a proportion such that a specific gravity in the range 0.5–0.6 is obtained;

adding at least one of a milk product, nuts, fruit juice, and an acidifier in a predetermined amount; and forming the resulting mixture into marshmallow candy elements of a selected shape and wrapping the same.

17. A method for producing a table type candy, comprising the steps of:

forming a jelly syrup by dissolving in a dissolving pot a mixture comprising 50 units of sugar, 50 units of starch syrup, and 17 units of water, to obtain for the dissolved mixture a saccharinity in the range 80–85%, to produce a jelly syrup; and boiling the jelly syrup at a temperature 100°-120° C.; cooling the jelly syrup overnight to solidify the same;

forming a soft bulk material by dissolving 44 units of sugar, 64 units of starch syrup, 10 units of a selected vegetable fat, 0.1 unit of an emulsifying agent, and boiling the mixture at a temperature of 125°-140° C., and cooling the same to form a soft bulk material;

mixing said solidified jelly syrup with a uniform mixture comprising at least one of sugar, grape sugar, starch, pectin, a gelling agent with a taste enhancer comprising at least one of a milk product and a powdered fruit juice; and drying the resulting mixture at a temperature of 40°-100° C. in a dryer;

forming the dried mixture into particles of selected shape and size in a grain-making machine;

adding a selected anti-adhesive agent and a selected flavor to the dried granulated mixture; and forming the flavored granulated mixture into candy tablets of selected shape and size.

* * * * *